United States Patent [19]
Creekmore et al.

[11] Patent Number: 5,534,697
[45] Date of Patent: Jul. 9, 1996

[54] ELECTRO-OPTICAL SENSOR SYSTEM FOR USE IN OBSERVING OBJECTS

[75] Inventors: Veron R. Creekmore, Chino Hills; John E. Davis, Claremont, both of Calif.

[73] Assignee: Rockwell International Corporation, Seal Beach, Calif.

[21] Appl. No.: 300,246

[22] Filed: Sep. 2, 1994

[51] Int. Cl.$^6$ .................................................. G01J 5/10
[52] U.S. Cl. ............................................................. 250/332
[58] Field of Search ................................................. 250/332

[56] References Cited

U.S. PATENT DOCUMENTS

| | | | |
|---|---|---|---|
| H877 | 1/1991 | Antesberger | 250/330 |
| 1,797,867 | 3/1931 | Karnes | 359/833 |
| 1,959,702 | 5/1934 | Barker | 340/524 |
| 2,244,235 | 6/1941 | Ayres | 359/504 |
| 2,638,033 | 5/1953 | Buchele et al. | 359/725 |
| 2,923,220 | 2/1960 | Bouwers | 354/96 |
| 3,151,524 | 10/1964 | Bouwers | 359/725 |
| 3,283,653 | 11/1966 | Tokarzewski | 359/725 |
| 3,514,186 | 5/1970 | Poncelet | 359/664 |
| 3,894,798 | 7/1975 | Wolf | 353/122 |
| 3,998,532 | 12/1976 | Dykes | 352/69 |
| 4,064,533 | 12/1977 | Lampe et al. | 348/25 |
| 4,463,357 | 7/1984 | MacDoran | 342/460 |
| 4,566,763 | 1/1986 | Greguss | 359/725 |
| 4,567,367 | 1/1986 | Brown de Colstoun et al. | 250/340 |
| 4,977,323 | 12/1990 | Jehle | 250/332 |
| 5,049,756 | 9/1991 | Brown de Colstoun et al. | 250/554 |
| 5,160,842 | 11/1992 | Johnson | 250/338.1 |
| 5,218,345 | 6/1993 | Muller et al. | 340/578 |
| 5,231,401 | 7/1993 | Kaman et al. | 342/55 |
| 5,281,815 | 1/1994 | Even-Tov | 250/339.04 |
| 5,300,780 | 4/1994 | Denney et al. | 250/342 |

*Primary Examiner*—Constantine Hannaher
*Attorney, Agent, or Firm*—Larry N. Ginsberg; Charles T. Silberberg; George A. Montanye

[57] ABSTRACT

An electro-optical sensor system for use in observing objects. A staring sensor is provided which includes a staring array of mid-wave infrared (IR) detectors for providing real-time observations of objects. A preprocessor system is connected to the staring sensor for providing temporal filtration of the real-time observations. A remote control is provided for controlling the temporal filtration.

10 Claims, 4 Drawing Sheets

ELECTRO-OPTICAL SENSOR SYSTEM FOR USE IN OBSERVING OBJECTS

BACKGROUND OF THE INVENTION

1. Field of the Invention

This invention relates to observations of a wide variety of objects using an electro-optical sensor system. More particularly, the present invention relates to the use of a staring sensor for real-time observations of objects, particularly forest fires and activities related to fighting the fire, detecting missile threats and detecting perimeter intruders.

2. Description of the Related Art

Acquisition sensors presently proposed to cover wide areas are, generally, scanning sensors. These sensors scan the field of regard very slowly to assure sensitivity. The scanning revisit time to detect distant low intensity targets can run to several minutes.

Particularly with respect to forest fires, some sensors are aircraft based in their use. They can relay the fire position for short periods of time but logistically and economically these aircraft cannot be used for repeated scans of the fire. The detection of land forms and relatively low level man-made objects (e.g. fire trucks) or natural objects (e.g. animals) in the presence of a fire by existing systems has not been accomplished. When a precise reference must be made between one element of the fire fighting team and the fire, a sensor which relies on a separate, uncalibrated spatial reference system can falsely provide distances between the observed features. The geodetic location of a moving fire relative to a crew requires precise knowledge of the relative positions. Smoke and emotions of the moment can mask life threatening situations. When an aircraft is dropping retardant on a fire, the smoke and rapidly changing geography and fire scene can make the approach and departure extremely hazardous.

SUMMARY OF THE INVENTION

The present invention is an electro-optical sensor system for use in observing objects. A staring sensor is provided which includes a staring array of photon detectors, which may include mid-wave infrared (IR) detectors for providing real-time observations of objects. A pre-processor system is connected to the staring sensor for providing temporal filtration of the real-time observations. A remote control is provided for controlling the temporal filtration.

In one preferred embodiment, the staring sensor is fixedly attached to a sensor mount. Such an embodiment is particularly useful when observing fire scenes or perimeter penetrations.

A second preferred embodiment includes a sensor mount which comprises a gimbal set for supporting the staring sensor. This embodiment is particularly applicable to a ship mounted sensor of the horizon and closely associated angles.

The electro-optical sensor system of the present invention is capable of detecting objects which may include fires; changes in fire scope or intensity over time; manmade objects including trucks, heavy vehicles, water tanks, roads, buildings, aircraft and large animals.

The display of these objects to assist an observer/controller in interpreting and managing his assets is preferably included in the sensor system. The sensor system performs the detection in near real-time and the display presents the processed data to enable timely response to rapidly changing conditions. The sensor system is relatively unencumbered by the smoke generated by the fire. The system controls the pre-processor system to optimize the manner in which the data is accumulated for the minimization of data link loading to the command center and optimization of the sensor operation. The sensor system may include the capability to add a second sensor to the basic staring sensor to point and track a selected object with enhanced spatial resolution and sensitivity.

With the addition of a broad-band spectrometer filter, minerals can be located. This is applicable to interplanetary landers.

BRIEF DESCRIPTION OF THE DRAWINGS

The same elements or parts throughout the figures are designated by the same reference characters.

DETAILED DESCRIPTION OF THE PREFERRED EMBODIMENT

Figure 1:
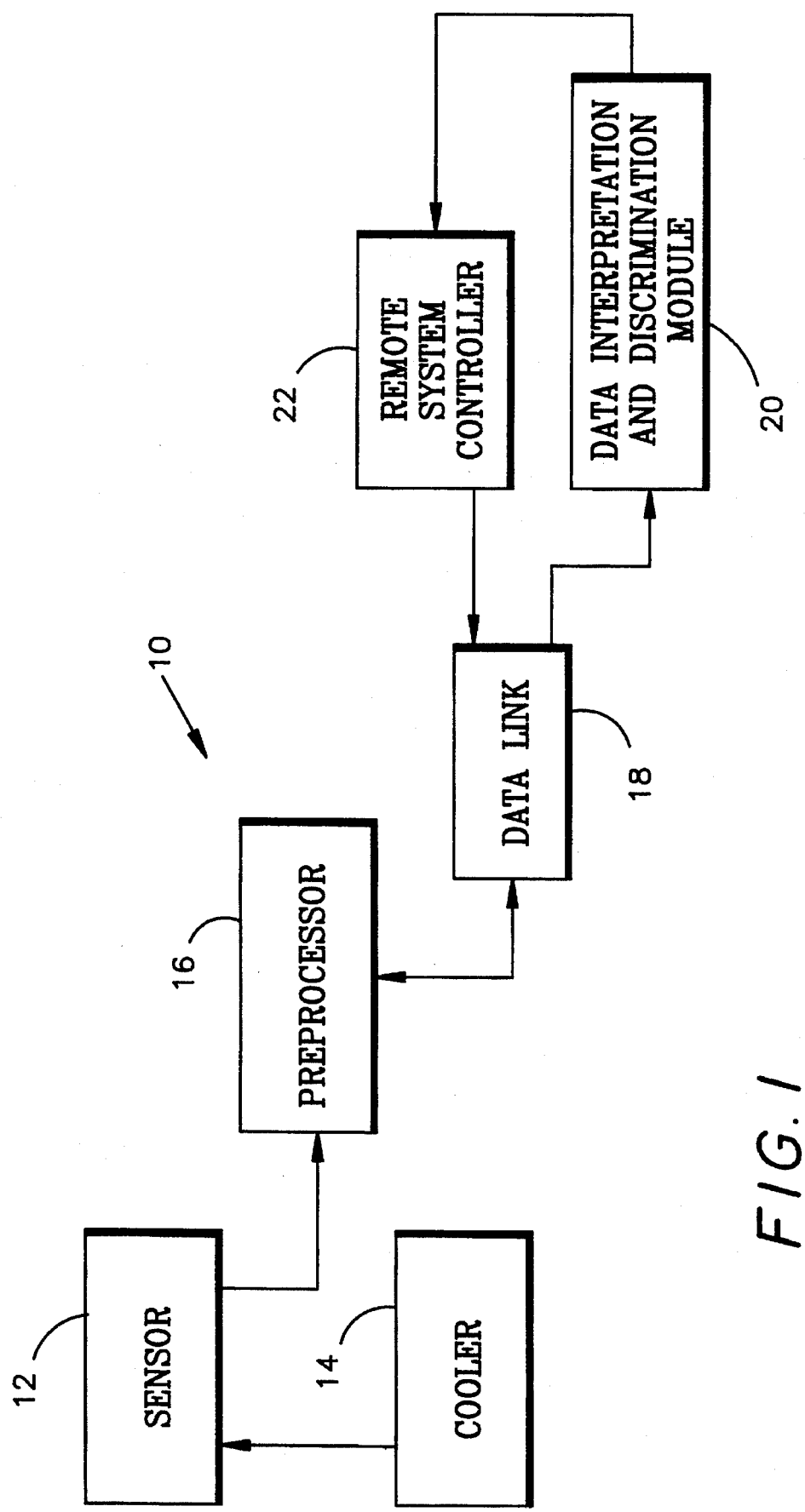
FIG. 1 is a functional flow diagram of the electro-optical sensor system of the present invention.

Referring now to the drawings and the characters of reference marked thereon, FIG. 1 illustrates a preferred embodiment of the electro-optical system of the present invention, designated generally as 10. A staring sensor 12 includes a staring array of mid-wave infrared (IR) detectors for providing real-time observations of objects. Staring sensor 12 is capable of viewing a total azimuth perspective with a relatively narrow elevation perspective. The elevation perspective may be below the horizon, through the horizon, or above the horizon. Staring sensor 12 has the attributes of long dwell time, short revisit time and the capability of separate sub-field of regard aggregation modes. As the term is used herein, "long dwell time" refers to the capability of a staring system which may have a dwell time for up to several seconds at a single location as opposed to a scanning system which may have a dwell time of milliseconds. As used herein, a "short revisit time" refers to a revisit time of milliseconds due to the frame time of the focal plane, as opposed to the revisit time of a scanning sensor, which may be as long as several minutes. With respect to the separate sub field of regard aggregation, the preprocessor 16 can have a signal aggregation in one area, wherein many sub-frames are summed to gain sensitivity while an adjacent region can difference frames to enhance contrast or change.

A cooler 14 is used to support sensor 12 if a conventional infrared focal plane array is used. If the focal plane is visible or an advanced infrared focal plane, the cooler may not be required. Cooler 14 may be a conventional thermo-electric cooler or other compressor driven cooler.

A pre-processor system 16 is connected to the staring sensor 12 for providing temporal filtration of real-time observations. Pre-processor system 16 is utilized to minimize the data link 18 transmission rates. It includes the electronics required to drive the focal plane of sensor 12 and includes waveform and d.c. level generators.

Data link 18 performs the transmission of data from the pre-processor 16 to a data interpretation and discrimination module 20. Data link 18 can be a hard wire from the pre-processor 16, a two-way radio link, or a gimbal across which the signal is transferred. A data interpretation and discrimination module 20 presents the data to the operator for his understanding and control of the sensor as well as dissemination of information to field operators. Such field operators may include fire commanders, battlefield commanders, pointing or designation sensors or similar narrow field sensors or weaponry. Module 20 feeds back commands to control the remote system controller 22. Controller 22 translates the desired modifications of aggregation into the pre-processor system 16 format.

Figure 2:
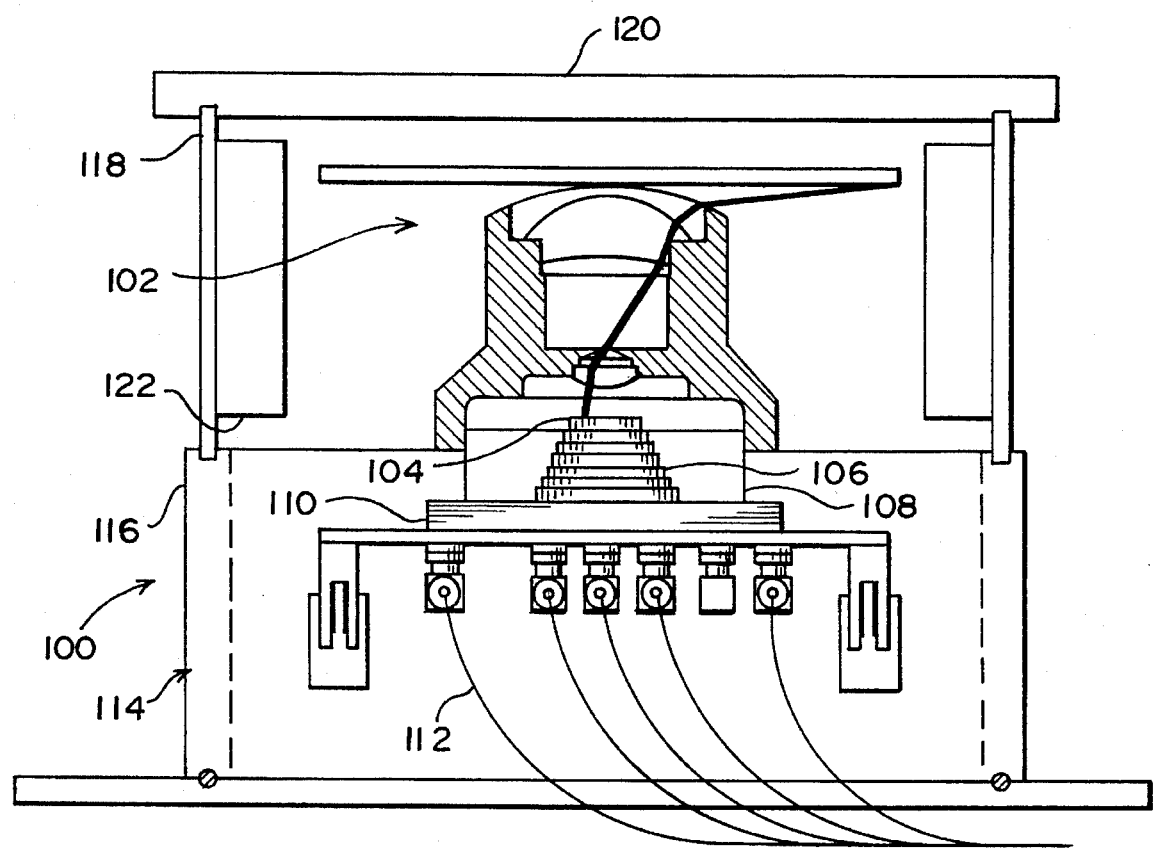
FIG. 2 is one embodiment of a staring sensor which includes a flat mirror.

Referring now to FIG. 2, an embodiment of a staring sensor is shown which utilizes a flat mirror, this embodiment being designated generally as 100.

Staring sensor apparatus 100 includes an optics assembly, designated generally as 102, for providing up to 360° azimuthal field of regard with a vertical field of regard near the horizon. A two-dimensional focal plane array (FPA) 104 collects and converts an incoming optical signature from the optics assembly 102 to an electrical wave form. The electrical wave form depicts the discrete energy falling on each pixel of the FPA 104 in a discrete unit of time. A cooler 106 is provided for keeping the FPA 104 at a desired operating temperature. The cooler 106 may be of a thermo-electric type or mechanical.

If an infrared FPA is utilized, an implementation could include a mercury cadmium telluride array which is indium bumped to a silicon multiplexer. The size of the array is preferably in a range of 256×256 pixels to 1024×1024 pixels. If a visible array FPA is desired, it may be of the silicon array type. Options for implementation of the FPA include normal square pixels or a set of concentric rings which are mapped back into a square array.

An evacuated dewar 108 is provided for isolating the FPA 104 and the cooler 106 from ambient conditions. A heat sink 110 and electrical connections 112 are included for interfacing electrical and mechanical connections of the sensor apparatus 100 to a mounting post.

A housing 114 includes a frame 116, a cylindrical window 118 and a roof 120 for protecting the sensor from the elements. Included inside of housing 114 is a cylindrical field limiter 122 to minimize the problems of off-axis radiation.

Figure 3:
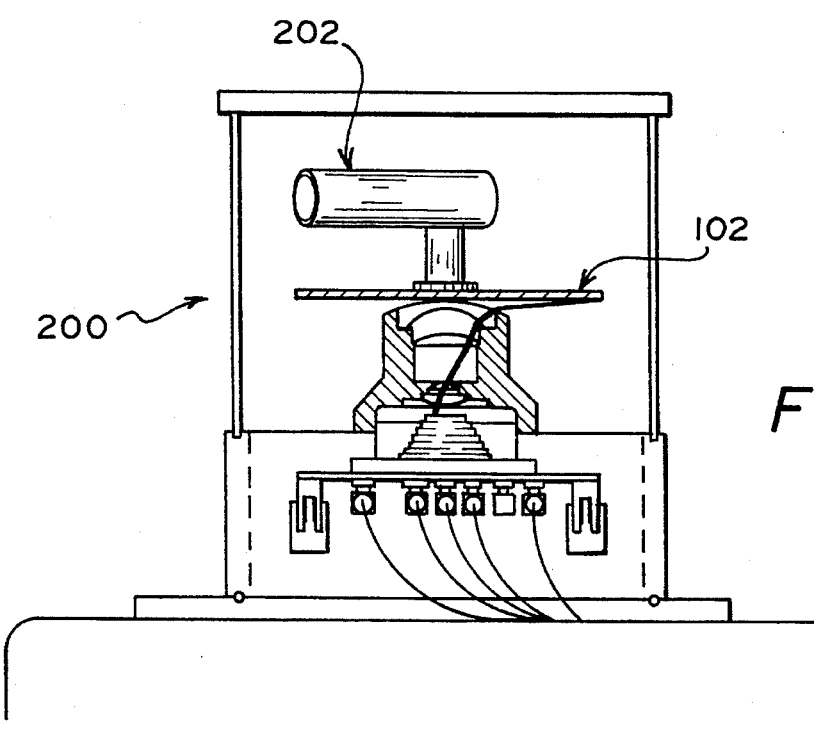
FIG. 3 illustrates the use of a staring sensor with an ancillary tracking sensor connected thereto for enhancing spatial resolution and sensitivity of real-time observations.

Referring now to FIG. 3, another embodiment is illustrated, designated generally as 200, which utilizes an ancillary tracking sensor 202. Tracking sensor 202 is connected to optics assembly 102 of a staring sensor. The tracking sensor 202 enhances the spatial resolution and sensitivity of real-time observations. It is mounted concentrically on the last optical element of the optics assembly 102 so as to direct its energy focused on the middle of the FPA 104.

Figure 4:
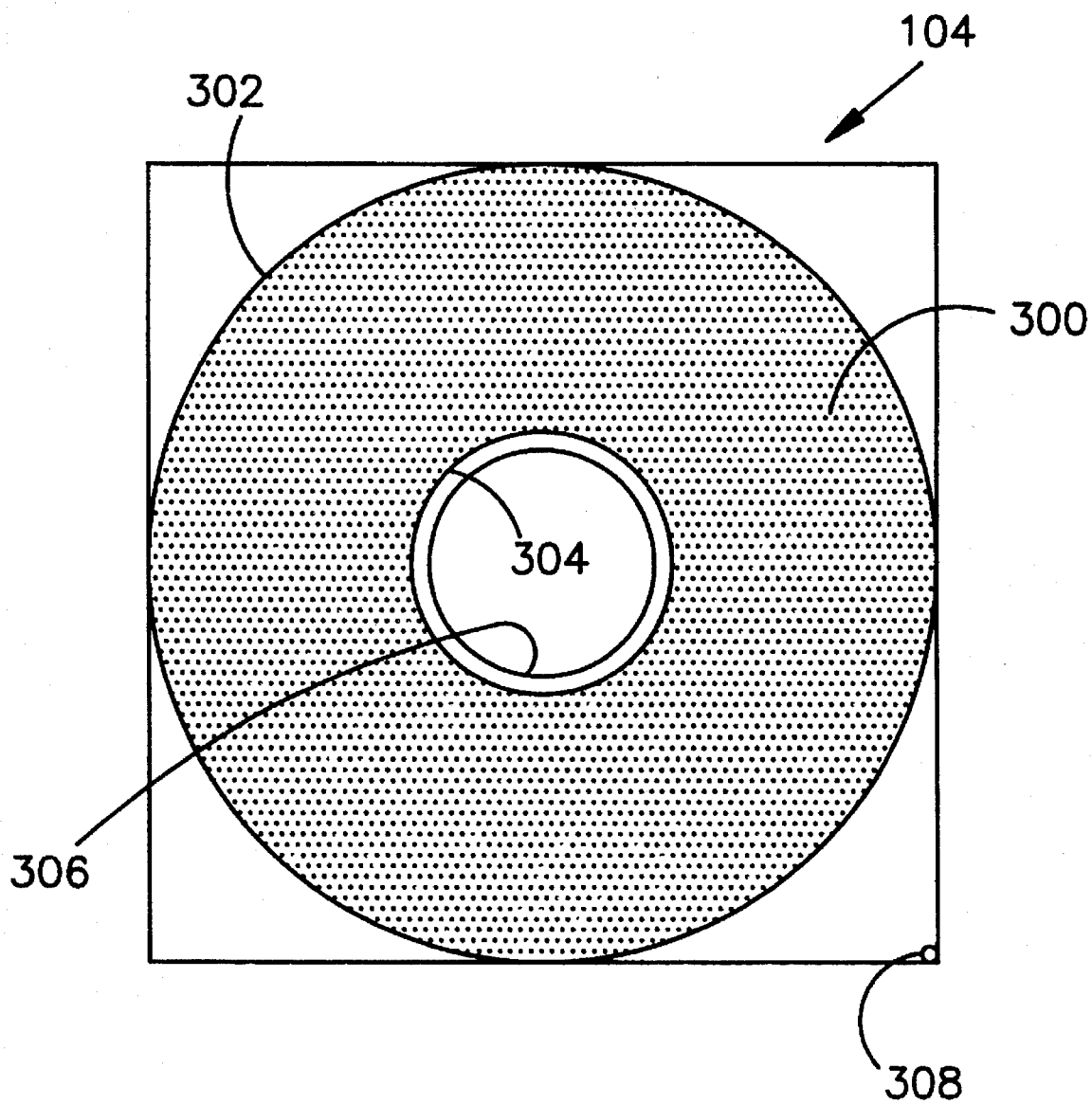
FIG. 4 is a map of the scene as projected onto a focal plane array, showing both the wide field sensor and the tracking sensor response regions.

Referring now to FIG. 4, the FPA 104 is depicted as viewed down the center of the optical axis. The azimuth direction is shown circumferentially around the shaded area 300. Circle 302 defines the farthest range or highest elevation of the sensor. Circle 304 defines the nearest range or lowest elevation of the sensor. The area within circle 306 defines the field of regard of the narrow field or tracking sensor 202. A typical pixel is indicated as 308.

Figure 5:
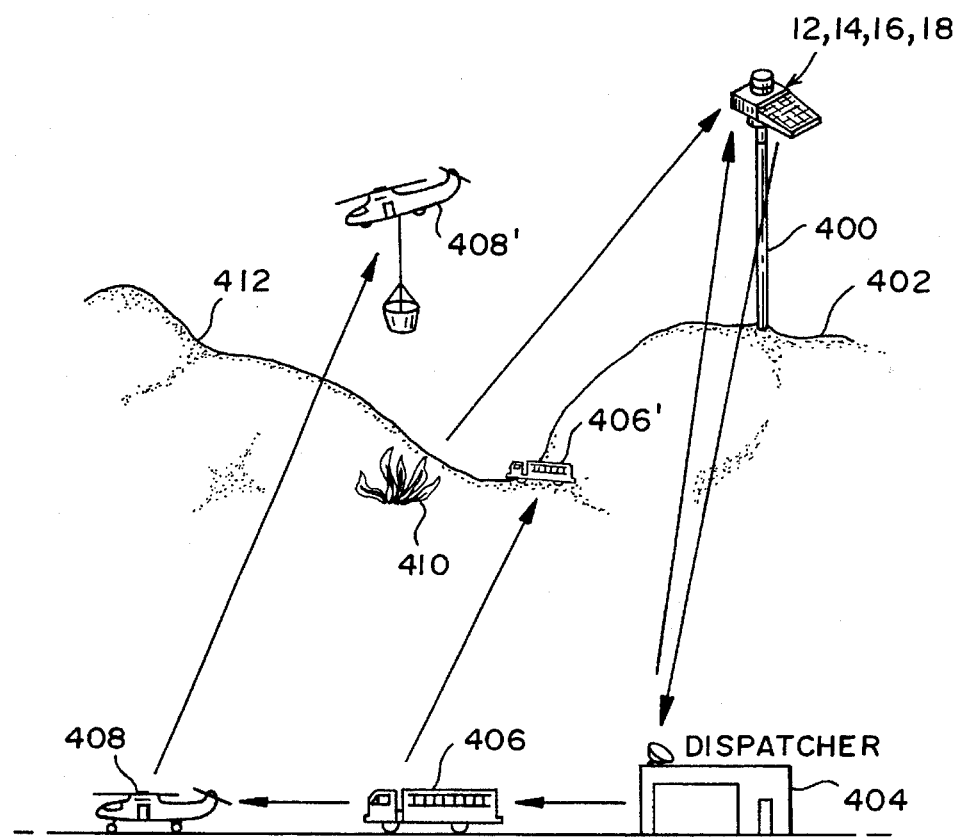
FIG. 5 illustrates the operation of the present invention relative to a fire fighting effort.

Referring now to FIG. 5, the operation of the present system 10 is illustrated with respect to its use as a fire monitor. Sensor 12, cooler 14, pre-processor system 16 and data link 18 are shown fixedly attached to a post or sensor mount 400. Sensor mount 400 is a post extending from a hilltop 402.

The other half of data link 18 is located at the dispatch center 404. Dispatch center 404 contains the data interpretation and discrimination module 20 and the remote system controller 22. The operator located in the dispatch center 404 interprets the data and sends commands to the fire units 406, 408.

The sensor 12 observes a fire 410 and sends the information on the extent and intensity of that fire to the dispatcher 404. The dispatcher 404 routes the fire trucks 406 and helicopter 408 to cover the fire 410. The sensor 12 detects the presence of the fire truck 406'. The truck 406' has been routed into the proximity of fire 410. Sensor 12 can detect the relationship between the fire line of 410 and its advance relative to the truck 406'. The dispatcher 404 can warn the truck and crew 406' of impending problems relative to the fire advance. The dispatcher 404 can also provide ready access to knowledge about roads or navigable terrain to either get into the fire or to escape from the fire, thus preserving the safety and lives of the brave fire fighters.

The dispatcher 404 can also see the location of the helicopter 408' and direct him in his flight path in attacking the perimeter of fire 410. He can also send to the helicopter a "personal perspective view" of exactly his approach to the fire line and to the mountains 412, which may be obscured by the smoke and turbulence arising from fire 410, thus preserving the life and safety of the helicopter pilot, who would be dropping retardant on the fire.

The key to being able to detect both the fire and the fire trucks, and the helicopters in the same view is the capability to change the aggregation mode of the sensor 12 on command from the dispatcher 404.

Figure 6:
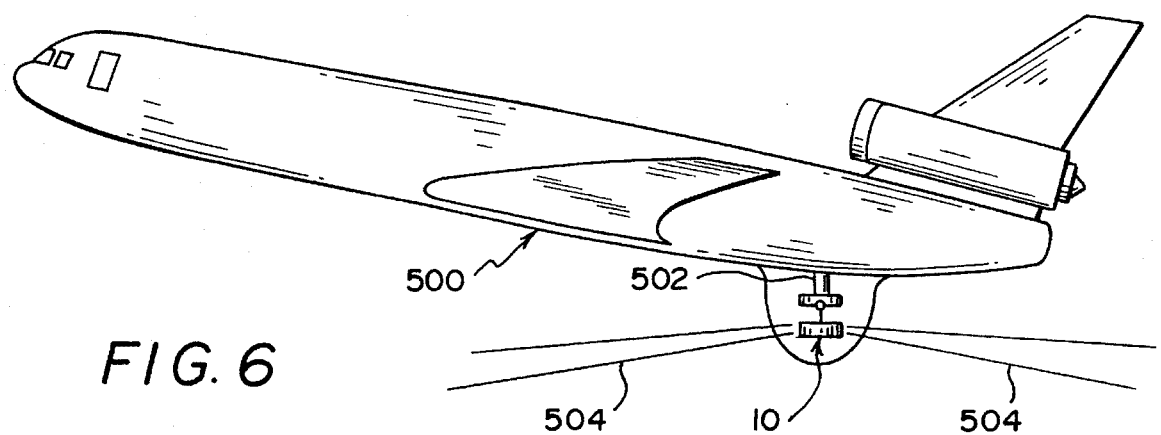
FIG. 6 illustrates the installation of the present invention on an aircraft to detect objects close to the horizon with a 360° aspect angle.

Referring now to FIG. 6, operation of the principles embodied by the present invention are shown as related to its use on an aircraft, designated generally as 500. System 10 includes a sensor mount 502, which comprises a gimbal set for supporting the sensor 12, cooler 14 and pre-processor 16. The other end of data link 18, the remote system controller 22, data interpretation and discrimination module 20 reside within the aircraft 500. The sensor 12 covers from below the horizon to above the horizon with a 360° aspect angle. This is maintained relative to the horizon and compass by the gimbal set 502. This is an example of a 3-axis gimbal installation. An incoming threat is observed by the sensor 12 and interpreted by the control operator using module 20. The sensor system 10 has been detecting and tracking the threat. The information is handed off to a follow-on sensor system to mount a counter-threat activity. The sensor field of regard is indicated by the fan rays 504.

Although the invention has been described with respect to its application to fires and on an aircraft, these applications have been described for the purpose of illustration and not limitation. Other applications may include, for example, land vehicles, space vehicles, planetary landers, and ships. In the application of this sensor system to a ship, a 2-axis gimbal would be used.

Obviously, many modifications and variations of the present invention are possible in light of the above teachings. It is, therefore, to be understood that, within the scope of the appended claims, the invention may be practiced otherwise than as specifically described.

What is claimed and desired to be secured by Letters Patent of the United States is:

1. An electro-optical sensor system for use in observing objects, comprising:
    a) a staring sensor comprising a staring array of photon detectors for providing real-time observations of objects, said staring sensor for viewing a total azimuth perspective with a relatively narrow elevation perspective;
    b) a preprocessor system connected to said staring sensor for providing temporal filtration of said real-time observations; and,
    c) a remote control for controlling said temporal filtration.

2. The system of claim 1, further comprising a sensor mount fixedly attached to said staring sensor.

3. The system of claim 1, further comprising a sensor mount comprising a gimbal set for supporting said staring sensor.

4. The system of claim 3, wherein said gimbal set comprises a 2-axis gimbal set.

5. The system of claim 3 wherein said gimbal set comprises a 3-axis gimbal set.

6. The system of claim 1, further comprising an ancillary tracking sensor connected to said staring sensor for enhancing spatial resolution and sensitivity of said real-time observations.

7. The system of claim 1, wherein said preprocessor system comprises means for varying the aggregation and differencing of said real-time observations.

8. The system of claim 1, wherein said preprocessor provides temporal filtration in which sub-frames are summed to gain sensitivity while an adjacent region can difference frames to enhance contrast thereby providing the capability of discriminating fires, fire trends, man-made materials and equipment, and natural objects, including animals.

9. The system of claim 1, further including a data interpretation and discrimination module for receiving data from said preprocessor system, interpreting and discriminating said data and disseminating resultant data to said remote control.

10. The electro-optical sensor system of claim 1, wherein said staring array of photon detectors comprises mid-wave infrared (IR) detectors.

\* \* \* \* \*